(12) United States Patent
Dageville et al.

(10) Patent No.: US 10,977,241 B2
(45) Date of Patent: Apr. 13, 2021

(54) MANAGING VERSIONS OF DATABASE METADATA IN STORAGE

(71) Applicant: Snowflake Inc., San Mateo, CA (US)

(72) Inventors: Benoit Dageville, San Mateo, CA (US); Martin Hentschel, Berlin (DE); William Waddington, San Mateo, CA (US)

(73) Assignee: Snowflake Inc., San Mateo, CA (US)

( * ) Notice: Subject to any disclaimer, the term of this patent is extended or adjusted under 35 U.S.C. 154(b) by 0 days.

(21) Appl. No.: 16/915,435

(22) Filed: Jun. 29, 2020

(65) Prior Publication Data

US 2020/0327115 A1  Oct. 15, 2020

Related U.S. Application Data

(63) Continuation of application No. 15/812,892, filed on Nov. 14, 2017, now Pat. No. 10,713,238.

(51) Int. Cl.
| | |
|---|---|
| *G06F 16/00* | (2019.01) |
| *G06F 16/23* | (2019.01) |
| *G06F 21/60* | (2013.01) |
| *G06F 16/22* | (2019.01) |
| *G06F 16/2455* | (2019.01) |

(52) U.S. Cl.
CPC .......... *G06F 16/2365* (2019.01); *G06F 16/00* (2019.01); *G06F 16/2282* (2019.01); *G06F 16/2358* (2019.01); *G06F 16/24552* (2019.01); *G06F 21/602* (2013.01)

(58) Field of Classification Search
CPC ..................................................... G06F 16/00
See application file for complete search history.

(56) References Cited

U.S. PATENT DOCUMENTS

| | | | |
|---|---|---|---|
| 9,348,576 B2 | 5/2016 | Hofhansl et al. | |
| 10,628,410 B1 | 4/2020 | Dageville et al. | |
| 10,713,238 B2 | 7/2020 | Dageville et al. | |
| 10,860,573 B2 | 12/2020 | Dageville et al. | |
| 2008/0082834 A1 | 4/2008 | Mattsson | |
| 2008/0263297 A1 | 10/2008 | Herbst et al. | |
| 2010/0293598 A1* | 11/2010 | Collart | H04N 21/64753 726/3 |

(Continued)

FOREIGN PATENT DOCUMENTS

| | | |
|---|---|---|
| CN | 111492354 A | 8/2020 |
| WO | WO-2019099446 A1 | 5/2019 |

OTHER PUBLICATIONS

"U.S. Appl. No. 15/812,892, Non Final Office Action dated Dec. 2, 2019", 6 pgs.

(Continued)

*Primary Examiner* — Ajith Jacob
(74) *Attorney, Agent, or Firm* — Schwegman Lundberg & Woessner, P.A.

(57) ABSTRACT

A method for a database system includes storing table data for a database, the table data including information in rows and columns of one or more database tables. The method includes storing metadata on immutable storage, the metadata including information about the table data for the database. In one embodiment, mutable metadata may be periodically consolidated in the background to create new versions of metadata files and which allows for deletions of old metadata files and old data files.

24 Claims, 12 Drawing Sheets

(56) References Cited

U.S. PATENT DOCUMENTS

| | | |
|---|---|---|
| 2014/0149656 A1 | 5/2014 | Cheriton |
| 2014/0279915 A1 | 9/2014 | Gadish et al. |
| 2015/0074392 A1 | 3/2015 | Boivie et al. |
| 2015/0317328 A1 | 11/2015 | Chhaunker et al. |
| 2016/0147750 A1 | 5/2016 | Blanco et al. |
| 2019/0147078 A1 | 5/2019 | Dageville et al. |
| 2019/0171838 A1 | 6/2019 | Struttmann |
| 2020/0117654 A1 | 4/2020 | Dageville et al. |
| 2020/0233856 A1 | 7/2020 | Dageville et al. |
| 2020/0364208 A1 | 11/2020 | Dageville et al. |

OTHER PUBLICATIONS

"U.S. Appl. No. 15/812,892, Notice of Allowability dated Jun. 8, 2020", 21 pgs.

"U.S. Appl. No. 15/812,892, Notice of Allowance dated Apr. 8, 2020", 7 pgs.

"U.S. Appl. No. 15/812,892, Response filed Mar. 2, 2020 to Non Final Office Action dated Dec. 2, 2019", 15 pgs.

"U.S. Appl. No. 16/710,414, Notice of Allowance dated Feb. 7, 2020", 7 pgs.

"U.S. Appl. No. 16/838,301, Non Final Office Action dated Jun. 1, 2020", 6 pgs.

"International Application Serial No. PCT/US2018/060922, International Search Report dated Feb. 7, 2019", 2 pgs.

"International Application Serial No. PCT/US2018/060922, Written Opinion dated Feb. 7, 2019", 13 pgs.

"Korean Application Serial No. 10-2020-7015386, Notice to File Missing Requirements dated Jun. 16, 2020", 2 pgs.

"U.S. Appl. No. 16/838,301, Notice of Allowance dated Oct. 23, 2020", 9 pgs.

"U.S. Appl. No. 16/838,301, Response filed Aug. 31, 2020 to Non Final Office Action dated Jun. 1, 2020", 10 pgs.

"U.S. Appl. No. 16/944,153, Non Final Office Action dated Sep. 30, 2020", 5 pgs.

\* cited by examiner

MANAGING VERSIONS OF DATABASE METADATA IN STORAGE

CROSS-REFERENCE TO RELATED APPLICATION

This application claims priority to U.S. patent application Ser. No. 15/812,892, filed Nov. 14, 2017, the contents of which are hereby incorporated by reference in their entirety.

TECHNICAL FIELD

The present disclosure relates systems, methods, and devices for databases and more particularly relates to storing and maintaining metadata using non-mutable storage services.

BACKGROUND

Databases are widely used for data storage and access in computing applications. Databases may include one or more tables that include or reference data that can be read, modified, or deleted using queries. Databases can store small or extremely large sets of data within one or more tables. This data can be accessed by various users in an organization or even be used to service public users, such as via a website or an application program interface (API). Both computing and storage resources, as well as their underlying architecture, can play a significant role in achieving desirable database performance.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
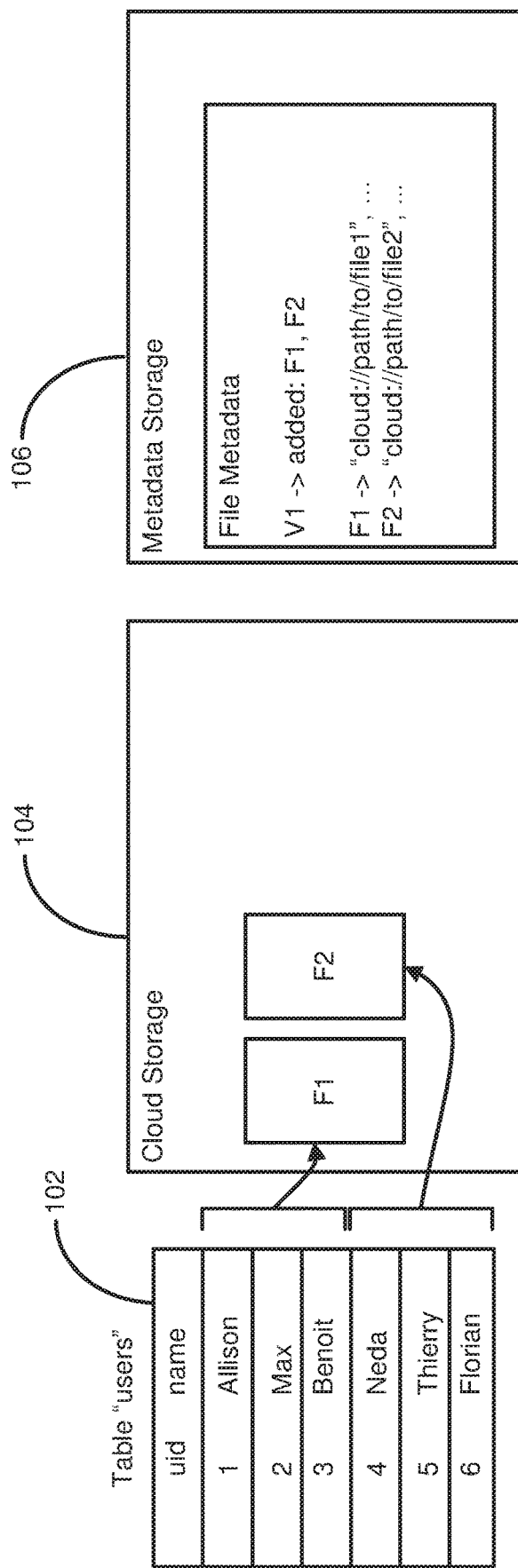
FIG. 1 is a block diagram illustrating a table having data stored in files and associated metadata according to an example embodiment of the systems and methods described herein.

The present disclosure is directed to system, methods, and devices for storing and maintaining mutable metadata using non-mutable storage services, such as cloud storage resources. Database systems store and maintain large amounts of metadata. This metadata describes the data that is stored in database tables of customers, but is not actually the stored table data. Metadata can get very large, especially if there are large database tables of many customers. Current database systems have severe limitations handling large amounts of metadata.

Current database systems store metadata in mutable storage devices and services, including main memory, file systems, and key-value stores. These devices and services allow the metadata to be updated data in-place. If a data record changes, it may be updated with the new information. The old information is overwritten. This allows databases to easily maintain mutable metadata: by updating metadata in-place.

However, these storage devices and services have limitations. The limitations are at least two-fold. First, mutable storage devices like main memory and file systems have a hard limit in terms of storage capacity. If the size of the metadata exceeds these limits, it is impossible to store more metadata there. Second, mutable storage services like key-value stores perform poorly when reading large volumes of metadata. Reading data is performed using range scans, which take a long time to finish. In practice, range scans can take many minutes or even approaching an hour to complete in large scale deployments.

These limitations make it impossible to store large amounts of metadata on existing mutable storage devices and services. Applicants have developed systems and methods for improved metadata storage and management that include storing metadata in immutable (non-mutable) storage. According to one embodiment, a method for storing or managing a database includes storing table data for a database. The table data includes information in rows and columns of one or more database tables. The method includes storing metadata on immutable storage. The metadata includes information about the table data for the database, but may not include the table data.

As used herein, immutable or non-mutable storage includes storage where data cannot, or is not permitted to be overwritten or updated in-place. For example, changes to data that is located in a cell or region of storage media may be stored as a new file in a different, time-stamped, cell or region of the storage media. Mutable storage may include storage where data is or permitted to be overwritten or updated in place. For example, data in a given cell or region of the storage media can be overwritten when there are changes to the data relevant to that cell or region of the storage media.

In one embodiment, metadata is stored and maintained on non-mutable storage services in the cloud. These storage services may include, for example, Amazon S3®, Microsoft Azure Blob Storage®, and Google Cloud Storage®. Many of these services do not allow to update data in-place (i.e., are non-mutable or immutable). Data files may only be added or deleted, but never updated. In one embodiment, storing and maintaining metadata on these services requires that, for every change in metadata, a metadata file is added to the storage service. These metadata files may be periodically consolidated into larger "compacted" or consolidated metadata files in the background. A metadata file version may be stored to indicate metadata files that correspond to the compacted or consolidated version versus the pre-compaction or pre-consolidation version of metadata files. In one embodiment, consolidation of mutable metadata in the background to create new versions of metadata files may allow for deletions of old metadata files and old data files.

By using immutable storage, such as cloud storage, embodiments allow storage capacity to not have a hard limit. Using storage services in the cloud allows for virtually unlimited amounts of metadata. Reading large amounts of metadata may be much faster because metadata files may be downloaded in parallel, including prefetching of files. Metadata files may also be cached on a local file system so that they are not downloaded more than once. In practical usage scenarios and testing, Applicants have seen a 200-fold performance improvement when reading metadata from storage services in the cloud when compared to reading the same metadata information from mutable storage like a key-value store.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description to provide a thorough understanding of the embodiments disclosed herein, some embodiments may be practiced without some or all these details. Moreover, for the purpose of clarity, certain technical material that is known in the related art has not been described in detail to avoid unnecessarily obscuring the disclosure.

Figure 2:
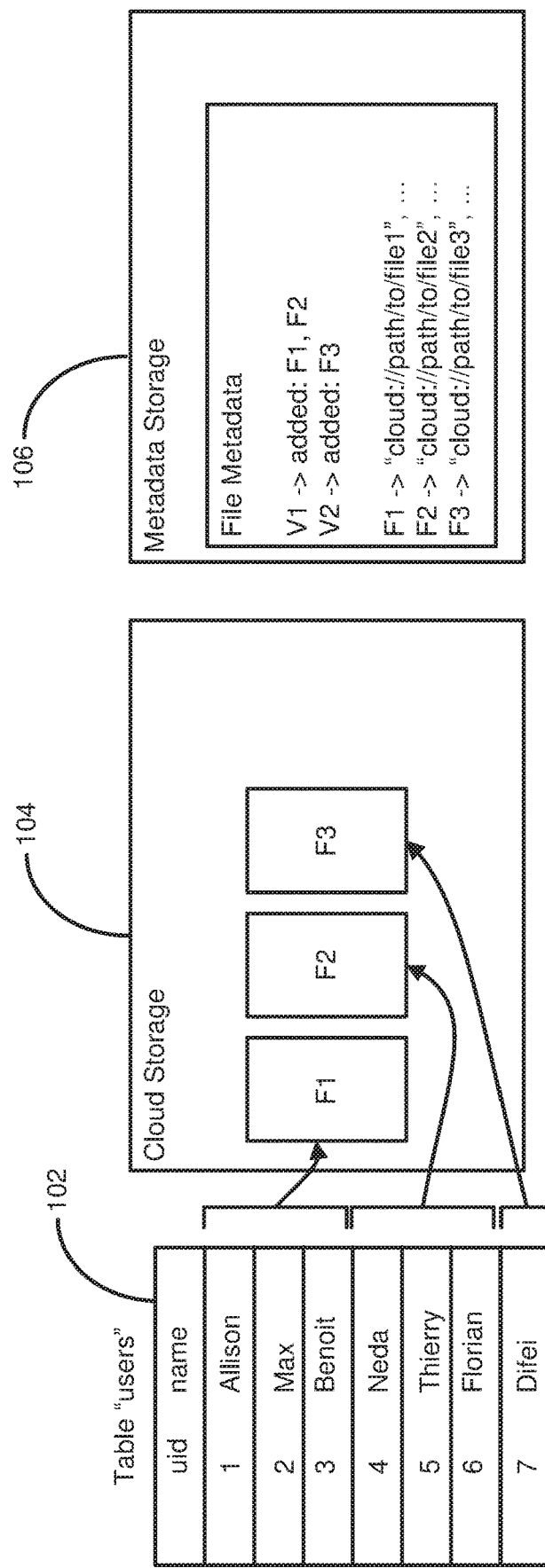
FIG. 2 is a block diagram illustrating the table and metadata of FIG. 1 after an addition to the table according to an example embodiment of the systems and methods described herein.
Figure 3:
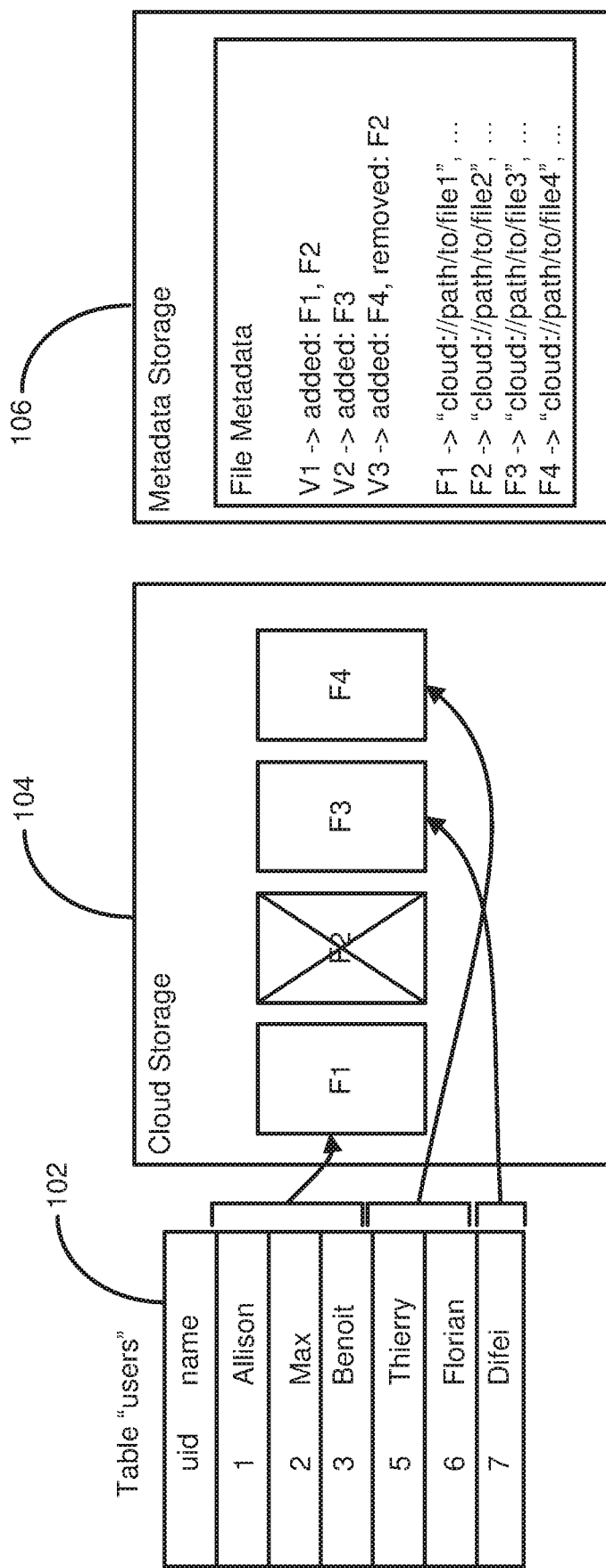
FIG. 3 is a block diagram illustrating the table and metadata of FIG. 2 after an addition to and deletion from the table according to an example embodiment of the systems and methods described herein.
Figure 6:
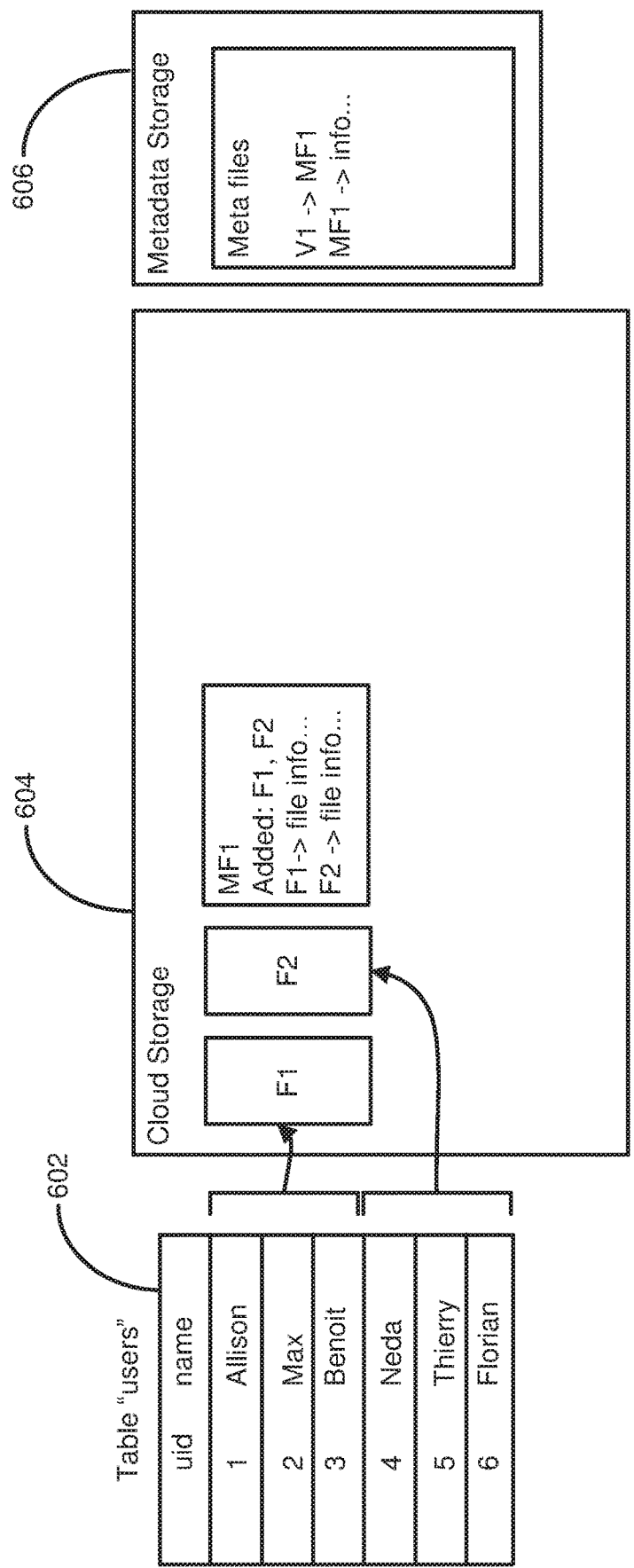
FIG. 6 is a block diagram illustrating a table having data stored in files and associated metadata files in immutable storage according to an example embodiment of the systems and methods described herein.
Figure 7:
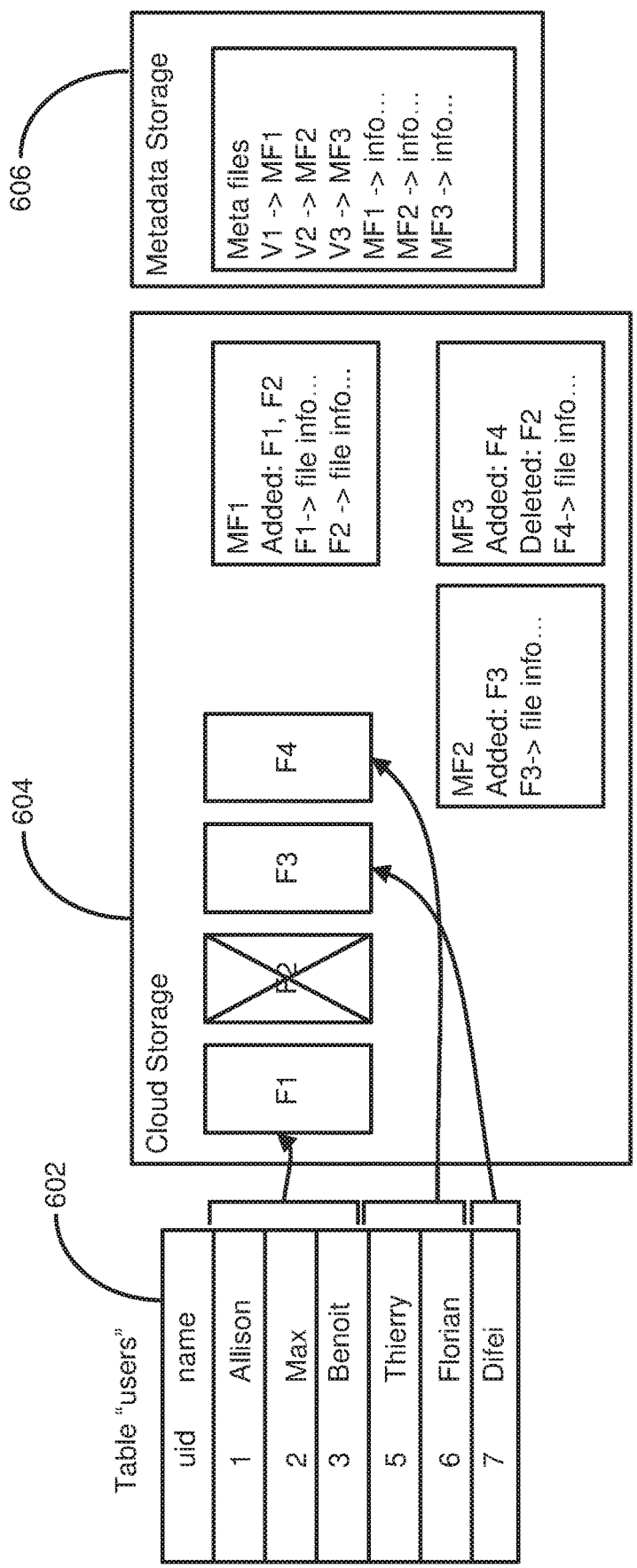
FIG. 7 is a block diagram illustrating the table and metadata of FIG. 6 after changes to the table according to an example embodiment of the systems and methods described herein.
Figure 8:
FIG. 8 is a block diagram illustrating consolidation of metadata files according to an example embodiment of the systems and methods described herein.

FIGS. 1-3 illustrate example operation of a database system when table data is stored in immutable storage (such as a cloud resource) and metadata is stored in mutable storage (such as a local key-value store). FIGS. 6-8 illustrate example operation of a database system when both table data and metadata is stored in immutable storage. In one example embodiment, data in database tables is stored in files in the cloud. Metadata around tables and files is stored in the metadata store. The metadata store may be a key-value store. Other example systems may use other technologies such as main memory storage or file system storage to store metadata.

FIG. 1 illustrates a table 102 having data stored in files and associated metadata. The table 102 is a "users" table stored in two physical files F1 and F2 in cloud storage 104. The table 102 includes a "uid" column and a "name" column. The files F1 F2 include the data (e.g., the field values) for the rows and columns of the table 102. Specifically, file F1 includes the table data for the first three rows (i.e., uids 1, 2, and 3 and names Allison, Max, and Benoit) while file F2 includes the table data for the last three rows (uids 4, 5, and 6, and names Neda, Thierry, and Florian). In one embodiment, each file F1 and F2 stores data in a column-by-column format with the values for the "uid" column in a contiguous block and the values for the "name" column in a contiguous block within the respective file.

File metadata is stored within metadata storage 106. The file metadata contains table versions and information about each table data file, this case F1 and F2. The metadata storage 106 may include mutable storage (storage that can be over written or written in-place), such as a local file system, system, memory, or the like.

In one embodiment, the file metadata consists of two data sets: table versions and file information. The table versions data set includes a mapping of table versions to lists of added files and removed files. File information consists of information about each file, including file path, file size, file key id, and summaries of all rows and columns that are stored in the file, for example. In the state illustrated, table version V1 indicates that files F1 and F2 were added (V1→added: F1, F2). The file information shows information about F1 (F1→"cloud://path/to/file1", fileSize: 16 MB, fileKeyId: 3452, summaries of rows and columns, etc.) and F2 (F2→"/path/to/file2", fileSize: 11 MB, fileKeyId: 7965, summaries of rows and columns, etc.).

Each modification of the table creates new files and new file metadata. Inserts into the table create new files. Deletes from the table remove files and potentially add new files with the remaining rows in a table if not all rows in a file were deleted. Updates remove files and replace them with new files with rows containing the updated records.

FIG. 2 illustrates the table and metadata of FIG. 1 after inserting a record in the "users" table 102. By way of example, when inserting the record (7, "Difei") into table "users," the data warehouse creates a new file F3 in the cloud storage 104 that contains this record. Furthermore, the file metadata in the metadata storage 106 has been updated to include a new table version V2 and information about F3. Table version V2 records that file F3 was added. File information includes the file path, account, created timestamp, file size, and summaries of all rows and columns that are stored file F3.

FIG. 3 illustrates the table and metadata of FIG. 2 after deleting a record in the "users" table 102. For example, when deleting the record (4, "Neda") from table "users," the warehouse may create a new file F4 that contains only two records (5, "Thierry") and (6, "Florian"). File F2 may be deleted from the cloud. File F4 may be the same as previous file F2 except that row with uid "4" has been removed. The new file F4 is stored in the cloud and the file metadata is updated with a new table version V3 and file information about file F4. V3 indicates that file F4 has been added and that file F2 has been deleted.

When retrieving data from a table, the data warehouse may compute a scan set of all files that need to be read. The scan set is an aggregation of all added files except files that were removed. The scan set may be computed using table versions. When selecting data from the table at the current time, the scan set is computed using all table versions up to the latest table version. When selecting data from the table at an earlier time, the scan set is computed using all table versions up to the table version that was current at the specified time. This technique of computing a scan set for any given time may be referenced herein as "time travel". For example, when a user (e.g., User 1 404 in FIG. 4) selects data from table "users" in FIG. 3 after V3 has been implemented, a database service manager (e.g., database service manager 404 of FIG. 4) computes the scan set using table versions V1, V2, V3. The scan set is an aggregation of all added files F1, F2, F3, F4 except deleted file F2. Therefore, the scan set at the current time consists of files F1, F3, F4.

As another example, when selecting data at an earlier time when table version V2 was current, the scan set is computed using table versions V1 and V2. The scan set is aggregation of all added files F1, F2, F3. Since there were no removed files, the scan set consists of files F1, F2, F3. In one embodiment, the scan set may be pruned using file information. For example, summaries of rows and columns of files may be used to prune files from the scan set because the contents of these files will not be needed to compute a query result.

The above example method of storing file metadata in the metadata storage 106 has limitations. It consumes too much space and results in slow performance. In practice, file metadata of hundreds of millions of files results in terabytes of file metadata. This results in slow performance when computing the scan set and pruning the scan set. Embodiments disclosed herein overcome one or more of these limitations. Storing and maintaining this (mutable) metadata on (non-mutable) cloud storage allows a database system to have virtually unlimited storage capacity and faster retrieval of metadata.

In one embodiment, metadata may be stored in metadata files in immutable storage. In one embodiment, a system may write metadata files to cloud storage for every modification of a database table. In one embodiment, a system may download and read metadata files to compute the scan set. The metadata files may be downloaded in parallel to improve scan set computation. In one embodiment, a system may periodically consolidate metadata files in the background. In one embodiment, performance improvements, including pre-fetching, caching, columnar layout and the like may be included. Furthermore, security improvements, including encryption and integrity checking, are also possible with metadata files with a columnar layout.

Figure 4:
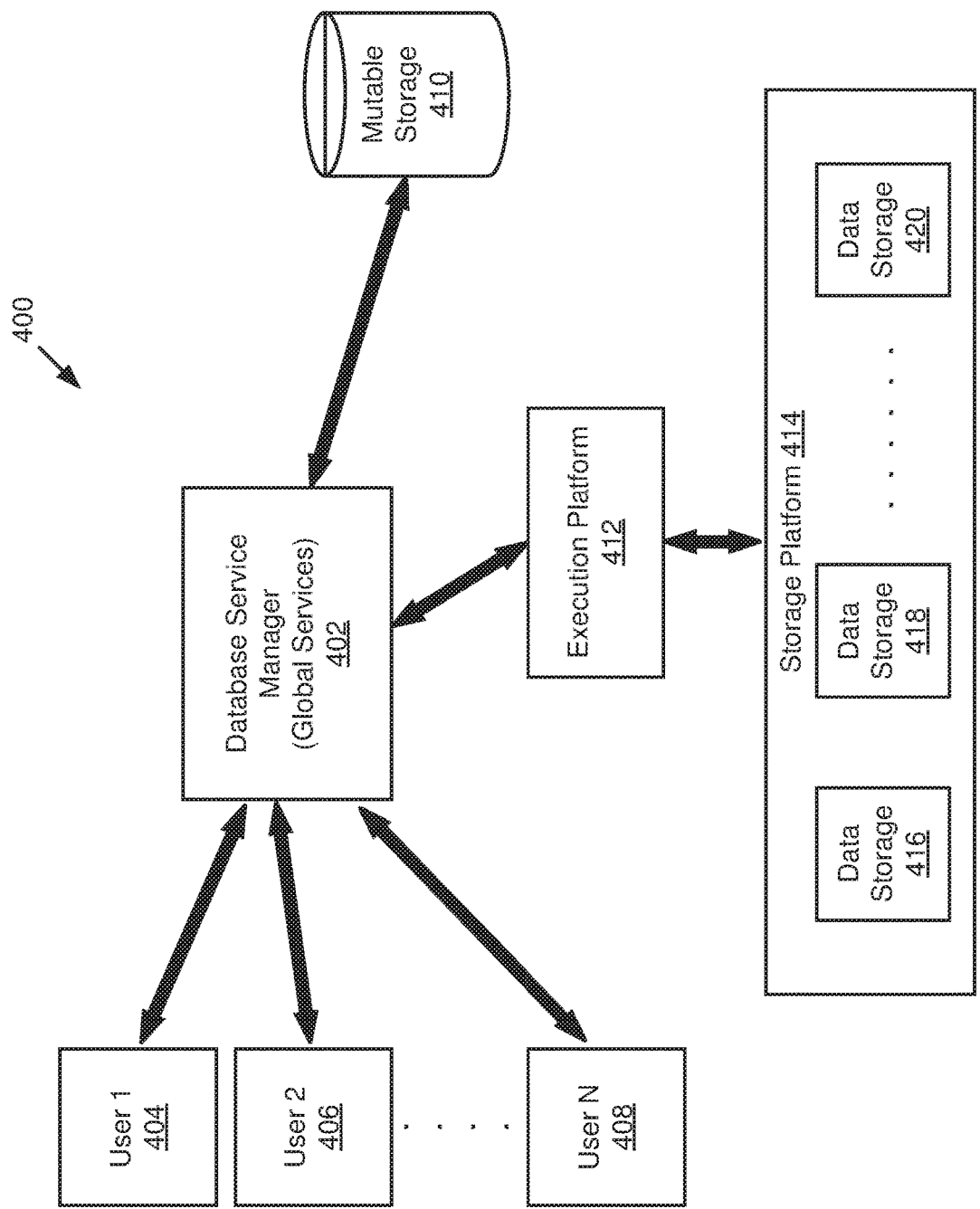
FIG. 4 is a block diagram illustrating a processing platform for a database system according to an example embodiment of the systems and methods described herein.

Turning to FIG. 4, a block diagram is shown illustrating a processing platform 400 for providing database services, according to one embodiment. The processing platform 400 includes a database service manager 402 that is accessible by multiple users 404, 406, and 408. The database service manager 402 may also be referred to herein as a resource manager or global services. In some implementations, database service manager 402 can support any number of users desiring access to data or services of the processing platform 400. Users 404-408 may include, for example, end users providing data storage and retrieval queries and requests, system administrators managing the systems and methods described herein, software applications that interact with a database, and other components/devices that interact with database service manager 402.

The database service manager 402 may provide various services and functions that support the operation of the systems and components within the processing platform 400. Database service manager 402 has access to stored metadata associated with the data stored throughout data processing platform 400. The database service manager 402 may use the metadata for optimizing user queries. In some embodiments, metadata includes a summary of data stored in remote data storage systems as well as data available from a local cache (e.g., a cache within one or more of the clusters of the execution platform 412). Additionally, metadata may include information regarding how data is organized in the remote data storage systems and the local caches. Metadata allows systems and services to determine whether a piece of data needs to be processed without loading or accessing the actual data from a storage device.

As part of the data processing platform 400, metadata may be collected when changes are made to the data using a data manipulation language (DML), which changes may be made by way of any DML statement. Examples of manipulating data may include, but are not limited to, selecting, updating, changing, merging, and inserting data into tables. As part of the processing platform 400, files may be created and the metadata may be collected on a per file and a per column basis. This collection of metadata may be performed during data ingestion or the collection of metadata may be performed as a separate process after the data is ingested or loaded. In an implementation, the metadata may include a number of distinct values; a number of null values; and a minimum value and a maximum value for each file. In an implementation, the metadata may further include string length information and ranges of characters in strings.

In one embodiment, at least a portion of the metadata is stored in immutable storage. For example, the metadata may be stored on the storage platform 414 along with table data. In one embodiment, the same or separate cloud storage resources as that used for table data may be allocated and used for the metadata. In one embodiment, the metadata may be stored in local immutable storage. In one embodiment, information about the metadata in immutable storage, or information about metadata files stored in immutable storage, is stored in mutable storage 410. The information about metadata may be referenced for locating and accessing the metadata stored in immutable storage. In one embodiment, systems with metadata storage may be restructured such that the metadata storage is used instead to store information about metadata files located in immutable storage.

Database service manager 402 is further in communication with an execution platform 412, which provides computing resources that execute various data storage and data retrieval operations. The execution platform 412 may include one or more compute clusters. The execution platform 412 is in communication with one or more data storage devices 416, 418, and 420 that are part of a storage platform 414. Although three data storage devices 416, 418, and 420 are shown in FIG. 4, the execution platform 412 is capable of communicating with any number of data storage devices. In some embodiments, data storage devices 416, 418, and 420 are cloud-based storage devices located in one or more geographic locations. For example, data storage devices 416, 418, and 420 may be part of a public cloud infrastructure or a private cloud infrastructure, or any other manner of distributed storage system. Data storage devices 416, 418, and 420 may include hard disk drives (HDDs), solid state drives (SSDs), storage clusters, or any other data storage technology. Additionally, the storage platform 414 may include a distributed file system (such as Hadoop Distributed File Systems (HDFS)), object storage systems, and the like.

In some embodiments, the communication links between database service manager 402 and users 404-408, mutable storage 410 for information about metadata files (i.e., metadata file metadata), and execution platform 412 are implemented via one or more data communication networks and may be assigned various tasks such that user requests can be optimized. Similarly, the communication links between execution platform 412 and data storage devices 416-420 in storage platform 414 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The database service manager 402, mutable storage 410, execution platform 412, and storage platform 414 are shown in FIG. 4 as individual components. However, each of database service manager 402, mutable storage 410, execution platform 412, and storage platform 414 may be implemented as a distributed system (e.g., distributed across multiple systems/platforms at multiple geographic locations) or may be combined into one or more systems. Additionally, each of the database service manager 402, mutable storage 410, the execution platform 412, and the storage platform 414 may be scaled up or down (independently of one another) depending on changes to the requests received from users 404-408 and the changing needs of the data processing platform 400. Thus, in the described embodiments, the data processing platform 400 is dynamic and supports regular changes to meet the current data processing needs.

Figure 5:
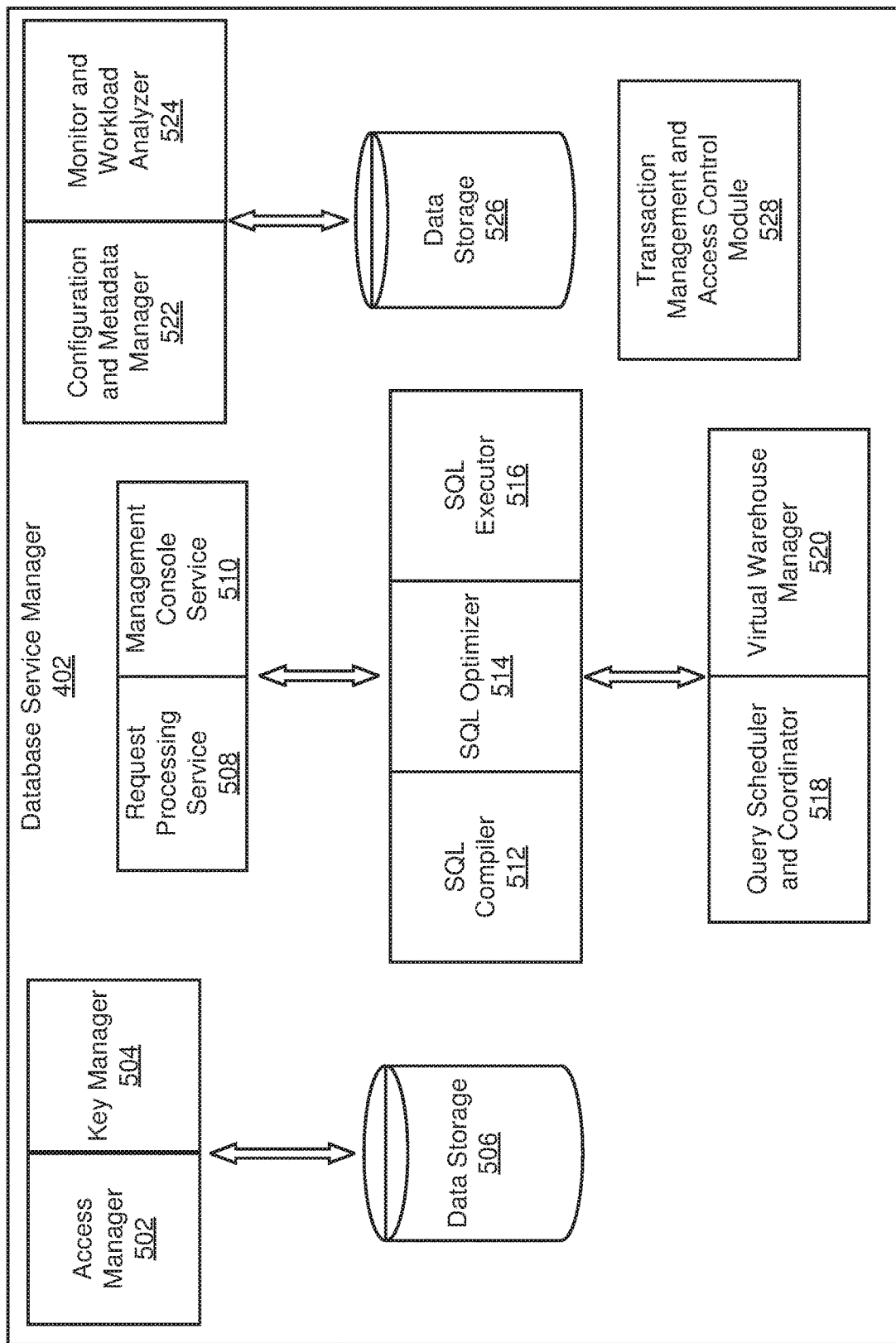
FIG. 5 is a block diagram illustrating components of a database service manager, according to one embodiment.

FIG. 5 illustrates a block diagram depicting components of database service manager 402, according to one embodiment. The database service manager 402 includes an access manager 502 and a key manager 504 coupled to a data storage device 506. The access manager 502 handles authentication and authorization tasks for the systems described herein. The key manager 504 manages storage and authentication of keys used during authentication and authorization tasks. A request processing service 508 manages received data storage requests and data retrieval requests. A management console service 510 supports access to various systems and processes by administrators and other system managers.

The database service manager 402 also includes an SQL compiler 512, an SQL optimizer 514 and an SQL executor 516. SQL compiler 512 parses SQL queries and generates the execution code for the queries. SQL optimizer 514 determines the best method to execute queries based on the data that needs to be processed. SQL executor 516 executes the query code for queries received by database service manager 402. A query scheduler and coordinator 518 sends received queries to the appropriate services or systems for compilation, optimization, and dispatch to an execution platform 512. A virtual warehouse manager 520 manages the operation of multiple virtual warehouses.

Additionally, the database service manager 402 includes a configuration and metadata manager 522, which manages the information related to the data stored in the remote data storage devices and in the local caches. A monitor and workload analyzer 524 oversees the processes performed by the database service manager 402 and manages the distribution of tasks (e.g., workload) across the virtual warehouses and execution nodes in the execution platform 412. Configuration and metadata manager 522 and monitor and workload analyzer 524 are coupled to a data storage device 526. In one embodiment, the configuration and metadata manger 522 collects, stores, and manages metadata in an immutable storage resource. In one embodiment, updates to metadata result in new files and are not updated in place.

Metadata files, as discussed herein, may include files that contain metadata of modifications (e.g., each modification) to any database table in a data warehouse. A modification of a database table may generate one or more metadata files, often just a single metadata file. In one embodiment, metadata files contain the following information: information about a metadata file, including a version number; a list of all added table data files; a list of deleted table data files; and information about each added table data file, including file path, file size, file key id, as well as summaries of all rows and columns that are stored in the table data file.

In one embodiment, the contents of metadata files may vary over time. If format or content of a metadata file changes, the version number of the metadata file may be incremented. In one embodiment, the metadata store (or other mutable data storage resource) only stores information about metadata files (which are stored in immutable storage), not about table data files. In practice, information about metadata files stored in in the metadata store (or other mutable storage) is very limited and may contain data for thousands of metadata files. In one embodiment, information for up to 30,000 metadata files may be stored within a metadata file. This dramatically reduces the amount of storage needed in the metadata store or other mutable storage.

In one embodiment, a system writes metadata files to cloud storage for every modification of a database table (e.g., modification of table data files). In addition to adding and deleting files, every modification to a database table in the data warehouse also generates one or more metadata files. Typically, a modification creates a single metadata file. However, if the modification to the table is large (e.g., an insert into a table that produces very many files), it may result in the creation of multiple metadata files. Further operation of the configuration and metadata manager 522 will be discussed further in relation to FIGS. 6-12.

The database service manager 402 also includes a transaction management and access control module 528, which manages the various tasks and other activities associated with the processing of data storage requests and data access requests. For example, the transaction management and access control module 528 provides consistent and synchronized access to data by multiple users or systems. Since multiple users/systems may access the same data simultaneously, changes to the data may be synchronized to ensure that each user/system is working with the current version of the data. Transaction management and access control module 528 provides control of various data processing activities at a single, centralized location in database service manager 402.

FIG. 6 illustrates the table 602 of FIG. 1 with metadata files stored in cloud storage. The user's table 602 is shown with table data stored in table data files F1 and F2 within cloud storage 604, similar to the structure shown in FIG. 1. However, metadata about the table data files is stored in metadata file MF1 in the cloud storage 604 as well. Metadata file MF1 contains a list of added files F1 and F2, including all file information about these files. For example, the file information that was previously in the key-value store in the embodiment of FIG. 1 is in the metadata file (e.g., MF1). At the point in time illustrated in FIG. 6, there are no deleted files indicated in the metadata file MF. The metadata storage 606 only stores table version V1, which maps to metadata file MF1, and information about metadata file MF1. The information about metadata file MF1 includes the file path of MF1 and may include more information. Thus, both table data files and metadata files are stored in cloud storage, while information about metadata files is stored in metadata storage 606 or other local and/or mutable storage.

FIG. 7 illustrates the table and metadata of FIG. 6 after adding a record (7, "Difei") and deleting a record (4, "Neda"). The first modification (insert uid "7" and name "Difei") stored file F3 and metadata file MF2 in the cloud. MF2 lists added file F3, including all file information about F3. The metadata storage 606 is updated with table version V2, which maps to MF2, and information about MF2. The second modification (delete uid "4" and name "Neda") stored file F4 and metadata file MF3 in the cloud storage 604. MF3 lists added table data file F4, including all file information of F4, and also lists deleted table data files of F2.

The storage of the metadata files MF1, MF2, and MF3 in cloud storage 604 or immutable storage allows for increased metadata storage capacity. For example, all metadata about the table data files F1, F2, F3, and F4 is found within the cloud storage 604 in the metadata files MF1, MF2, and MF3. Metadata about the metadata files MF1 (information about the metadata), which is much smaller in size, is stored in a key-value store, mutable storage, and/or local storage.

In one embodiment, a data warehouse computes a scan set of files that must be read to answer a query. The scan set is computed using table versions. Given a set of table versions, the data warehouse reads information about the corresponding metadata files from the metadata store. It then downloads the metadata files from the cloud and reads the list of added and delete files. Using these lists, it computes the scan set. Using file information stored in metadata files (e.g. information about rows and columns), the scan set may be pruned.

For example, when selecting data from table "users" at the time illustrated in FIG. 7, the scan set is computed using table versions V1, V2, and V3. The warehouse reads information about corresponding metadata files MF, MF2, and MF3. It downloads these metadata files from the cloud. The files may be downloaded in parallel. In one embodiment, the database service manager 402 can begin reading one of the files even if the others have not yet completely downloaded. From the aggregated list of added files F1, F2, F3, and F4 it removes deleted file F2. The resulting scan set would therefore be F1, F3, and F4. These files (or sub-portions of them) may be retrieved by an execution node for executing the query.

In one embodiment, metadata files are periodically consolidated in the background. Consolidation, or "compaction," of metadata files aggregates all added files of all metadata files and removes all deleted files from that list. Consolidation creates one or more compacted metadata files that contain only the resulting added-files list, including all file information of these files. The purpose of consolidation two-fold. First, many metadata files are compacted into a much smaller set of metadata files for faster downloading and reading. Second, files that are not referenced anymore in the compacted metadata files can be removed from the cloud once the old metadata files are removed.

Metadata file versions distinguish different sets of metadata files. The compacted files in one metadata file version are a consolidation of all metadata files of the previous metadata file version. New metadata files are always registered under the latest metadata file version. Old metadata files may be deleted from cloud storage after they have been consolidated. All files that are not referenced in compacted files may be deleted once they are not referenced in any metadata file anymore.

FIG. 8 is a block diagram illustrating consolidation of the metadata files shown in FIG. 7. Specifically, metadata files MF1, MF2, and MF3 are shown consolidated into compacted metadata file MF4. Metadata file MF4 only contains added files F1, F3, F4 because F2 was deleted in MF3. MF4 also contains all file information of F1, F3, and F4. In one embodiment, metadata file version MF V3 is created and MF4 is registered under MF V3. A new metadata file MF5 is registered under the latest metadata file version MF V3. MF5 corresponds to table version V4 (not shown in FIG. 7). Table version V3 may point to either MF1, MF2, and MF3 of MF V1 or to MF4 of MF V3, as they will result in the exact same scan set. As is illustrated, creation of the consolidated metadata file MF4 allows for one file to do what previously took three files. In one embodiment, an indication of a metadata file version may be stored after completing consolidation so that a version before the consolidation may still be determined or accessed. All subsequent table data changes may be reflected based on MF4 or later. Thus, MF1, MF2, and MF3 may be deleted, if desired or if they represent versions which no longer need to be maintained (e.g., for purposes of a "time travel" feature).

Constructing the scan set for a table version uses only metadata files of a single metadata file version. The metadata file version to use is the largest metadata file version that is smaller or equal than the given table version. For example, constructing the scan set for table version V3 in FIG. 7 uses metadata file version V3 because it is the largest metadata file version that is smaller or equal to V3. Given the example in FIG. 7, Table 1 provides a list of metadata files that must be read when constructing the scan set for a given table version:

TABLE 1

| Table Version | Metadata File Version | Metadata Files | Scan Set |
| --- | --- | --- | --- |
| V1 | MF V1 | MF1 | F1, F2 |
| V2 | MF V1 | MF1, MF2 | F1, F2, F3 |
| V3 | MF V3 | MF4 | F1, F3, F4 |
| V4 | MF V3 | MF4, MF5 | F3, F4, F5 |

In one embodiment, consolidation of metadata files happens in the background process in the data warehouse without any impact on the user workload. New metadata files may be added while compacted files are computed. Only when the compacted file has been uploaded to the cloud it may be used to compute that scan set.

Various performance improvements may be achieved with the immutable storage of metadata. In one embodiment, metadata files are prefetched. For example, when downloading a set metadata files, the data warehouse downloads the metadata files in parallel in the background before the metadata files are opened by the process. Pre-fetching improves reading time of metadata files because when the process wants to open a metadata file it may have already been downloaded using pre-fetching.

In one embodiment, metadata files are cached. Metadata files may be cached on the local file system of a process. Metadata files may only be downloaded once, even if they are read by many difference processes that share the same file system. Old cached metadata files may be deleted from the cache if the cache grows out of space. In this case, the metadata files may be downloaded again as needed.

In one embodiment, metadata files have a columnar layout. File information within metadata files is stored with a columnar layout. This means the format of the metadata file is not row-by-row, but column-by-column. If a process reads information about a column in a metadata file, it only needs to read a single, contiguous block of bytes. In one embodiment, every block of bytes is compressed using a standard compression algorithm ("gzip"). Both these techniques improved read performance.

Security improvements are also implemented in some embodiments. In one embodiment, metadata files are encrypted using individual file keys. Within a metadata file, columns may be encrypted individually using AES-CTR mode with different start counters. This allows a database system to read an individual column from a metadata file because it can be decrypted without needing to decrypt the whole file at once. Encryption improves security because nobody can read the metadata file without having the proper file key.

For verification that metadata files have not been altered, the system may store hashes of columns for each column within a metadata file. Before decrypting the data, the system compares the hash of the encrypted column with the stored hash of the column of this metadata file. If the hashes do not match, the metadata file must have been altered. This improves security because altering of metadata files are detected by the database system.

Figure 9:
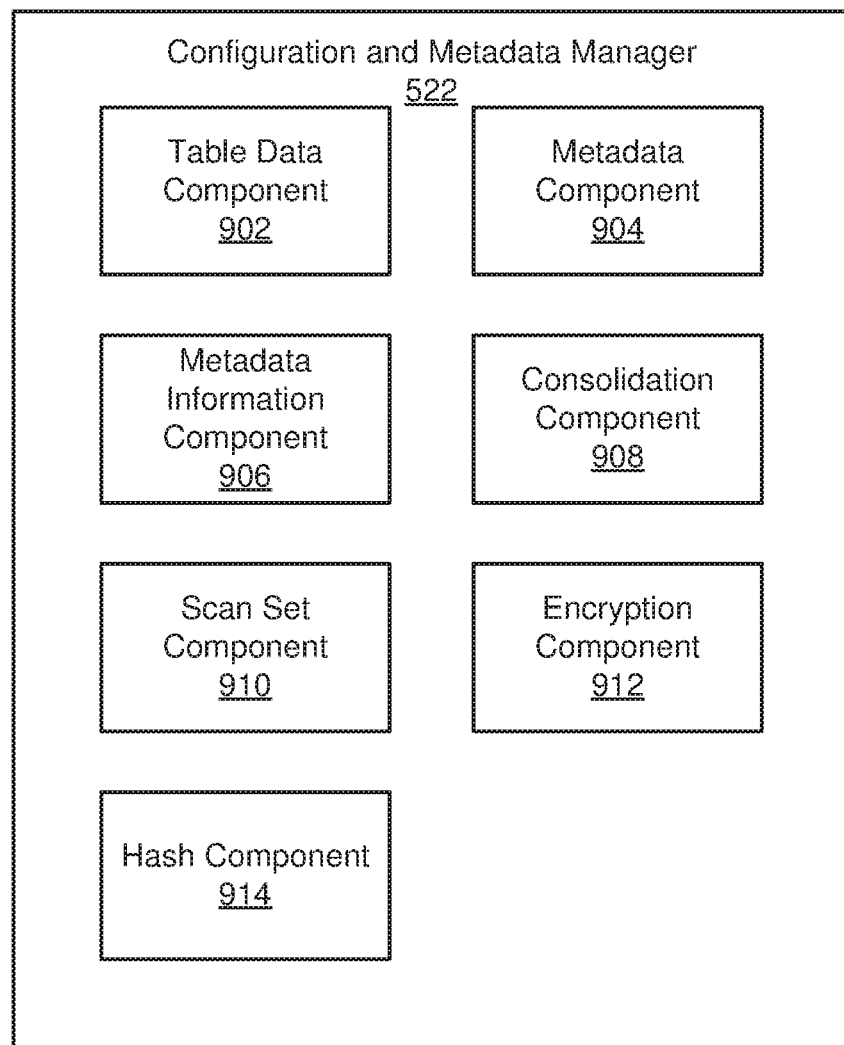
FIG. 9 is a block diagram illustrating components of a configuration and metadata manager, according to one embodiment.

FIG. 9 is a schematic block diagram illustrating components of a configuration and metadata manager 522, according to one embodiment. The configuration and metadata manager 522 may collect, store, and manage metadata about table data files as well as metadata about metadata files. The configuration and metadata manager 522 includes a table data component 902, a metadata component 904, a metadata information component 906, a consolidation component 908, a scan set component 910, an encryption component 912, and a hash component 914. The components 902-914 are given by way of illustration only and may not all be included in all embodiments. In fact, some embodiments may include only one or any combination of two or more of the components 902-914. For example, some of the components may be located outside or separate from the configuration and metadata manager 522, such as within a database service manager 402 or processing platform 400. Furthermore, the components 902-914 may comprise hardware, computer readable instructions, or a combination of both to perform the functionality and provide the structures discussed herein.

The table data component 902 stores table data for a database, the table data includes information in rows and columns of one or more database tables. The table data component 902 may store table data in table data files within a storage resource. Example storage resources include cloud storage and/or immutable storage. In one embodiment, the storage resources for storage of table data files may be dynamically allocated to accommodate increases or decreases in storage requirement. The table data component 902 may manage and store table data by causing the data to be stored or updated in a remote resource, such as a cloud storage resource or service.

The metadata component 904 stores metadata on immutable storage. The metadata may include information about or describing the table data for the database stored by the table data component 902. In one embodiment, the metadata files may include metadata such as an indication of added or deleted table data files. The metadata may include file information for table data files, the file information including one or more of a file name and a storage location. In one embodiment, the metadata may be stored in files on the same cloud storage resources as the table data. In one embodiment, metadata component 904 may cause the metadata to be stored within metadata files in a column-by-column format in remote cloud storage.

The metadata component 904 may also collect and manage storage of metadata within metadata files on the immutable storage. The metadata component 904 may create, in response to a change in the table data, a new metadata file in the immutable storage without modifying previous metadata files. The new metadata file may include metadata indicating the change in the table data. In one embodiment, the metadata in the new metadata file indicates an addition or a deletion of a table data file comprising the table data. The metadata component 904 may also delete expired metadata files. Expired metadata files may include those older than a specific age and that are not referenced in metadata information stored by the metadata information component 906.

The metadata information component 906 stores and manages information about the metadata in mutable storage. The information about the metadata (metadata about metadata files) may be stored in local mutable storage and/or in metadata storage (or what was previously referenced as metadata storage. In one embodiment, however, the information about the metadata only includes information about metadata files, not metadata about table data files. Thus, all table data metadata may be located in immutable storage. In one embodiment, the information about metadata may be stored and updated in place. For example, the information about the metadata, in one embodiment, is stored in a key-value store. The information about the metadata includes information indicating a version and indicating one or more metadata files that included metadata corresponding to the version.

The consolidation component 908 consolidates or compacts metadata from two or more old metadata files into a consolidated metadata file. In one embodiment, the consolidated metadata file includes metadata reflecting the table data changes indicated in the two or more old metadata files. In one embodiment, the consolidation component 908 deletes the two or more old metadata files. The consolidation component 908 may delete one or more table data files not referenced by metadata in the consolidated metadata file.

The scan set component 910 is may compute a scan set for a query. In one embodiment, a database system may receive a query directed to a database that includes the table data. The scan set component may retrieve a plurality of uncached metadata files, or cause another component to do so. The metadata files may include metadata files that correspond to the query. In one embodiment, the scan set component downloads the metadata files in parallel from the immutable storage. In one embodiment, the scan set component determines the scan set by reading a first metadata file before a second metadata file has been fully downloaded. This may allow for improved speed in computing scan sets because the processing and downloading of metadata can be done file by file or in chunks. Thus, a database system does not need to wait for all files to download before it starts computing the scan set, it can compute the scan set as the metadata files are retrieved (either from cache or from immutable storage). In one embodiment, the scan set indicates one or more table data files needed to perform the query.

The encryption component 912 is configured to encrypt table data and metadata. In one embodiment, the encryption component 912 encrypts the metadata column-by-column to allow for independent decryption and reading of metadata for a specific column.

The hash component 914 computes and stores hashes for columns. For example, upon creating a metadata file, the hash component 814 may compute a has for each column in the metadata file and store the hash. Later, when a column in the file is accessed, the hash component 914 may compute the hash and compare it to the stored hash. If the hashes are different, the hash component 914 may determine that the metadata in that column has been altered.

Figure 10:
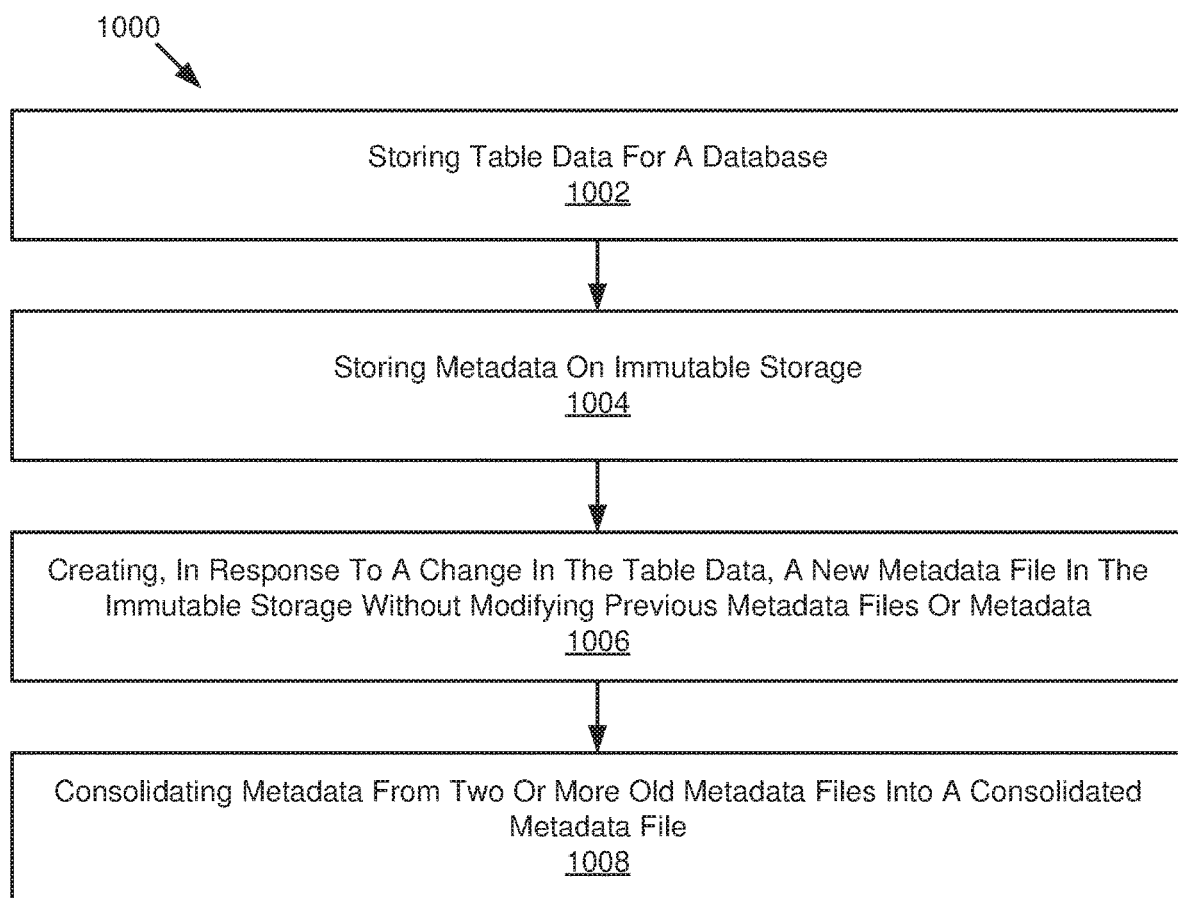
FIG. 10 is a schematic flow chart diagram illustrating a method for managing metadata in a database system, according to one embodiment.

FIG. 10 is a schematic flow chart diagram illustrating an example method 1000 for managing metadata in a database system. The method 1000 may be performed by a configuration and metadata manager 522, database service manager 402, processing platform 400, and/or other service or platform.

The method 1000 begins and a table data component 902 stores 1002 table data for a database, the table data including information in rows and columns of one or more database tables. A metadata component 904 stores 1004 metadata on immutable storage, the metadata includes information about the table data for the database. The metadata component 904 creates 1006, in response to a change in the table data, a new metadata file in the immutable storage without modifying previous metadata files. The new metadata file includes metadata indicating the change in the table data. A consolidation component 908 consolidates 1008 metadata from two or more old metadata files into a consolidated metadata file.

Figure 11:
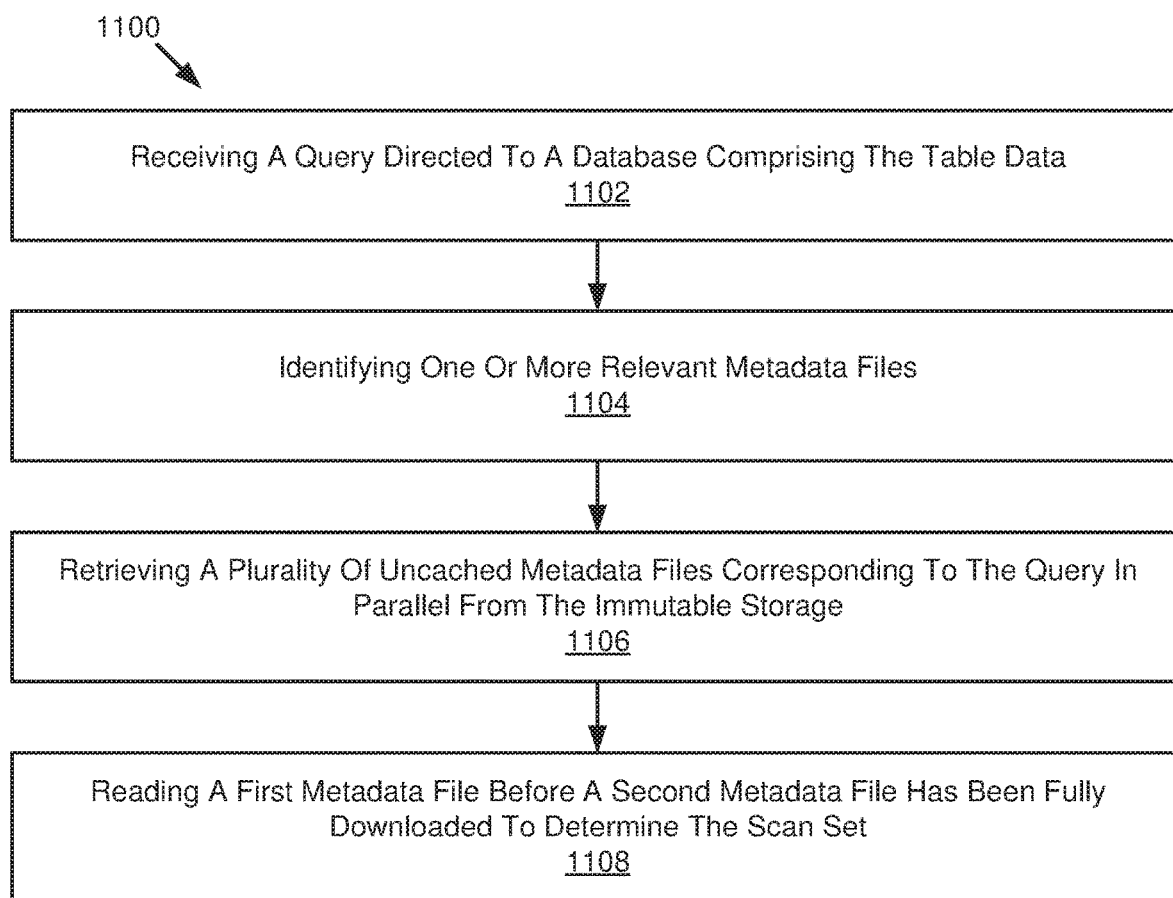
FIG. 11 is a schematic flow chart diagram illustrating a method for computing a scan set, according to one embodiment.

FIG. 11 is a schematic flow chart diagram illustrating an example method 1000 for computing a scan set in a database system. The method 1100 may be performed by a configuration and metadata manager 522, database service manager 402, processing platform 400, and/or other service or platform.

The method 1100 begins and a database system receives 1102 a query directed to a database comprising the table data. A scan set component 910 identifies 1104 one or more relevant metadata files. For example, the scan set component 910 may identify 1104 the relevant metadata files based on information about the metadata files stored in metadata storage or immutable storage. The scan set component 910 retrieves 1106 a plurality of uncached metadata files corresponding to the query in parallel from the immutable storage. For example, if there are a plurality of metadata files that are needed to compute the scan set, but are not located in cache, the plurality of metadata files may be downloaded in parallel. The scan set component 910 reads 1108 a first metadata file before a second metadata file has been fully downloaded to determine the scan set. For example, the scan set component 910 does not need to wait until all metadata files are downloaded to begin compute the scan set, it can begin computing the scan set as files are retrieved/downloaded. The scan set may be provided to an execution node and/or otherwise used to retrieve table data files or information needed for processing a query.

Figure 12:
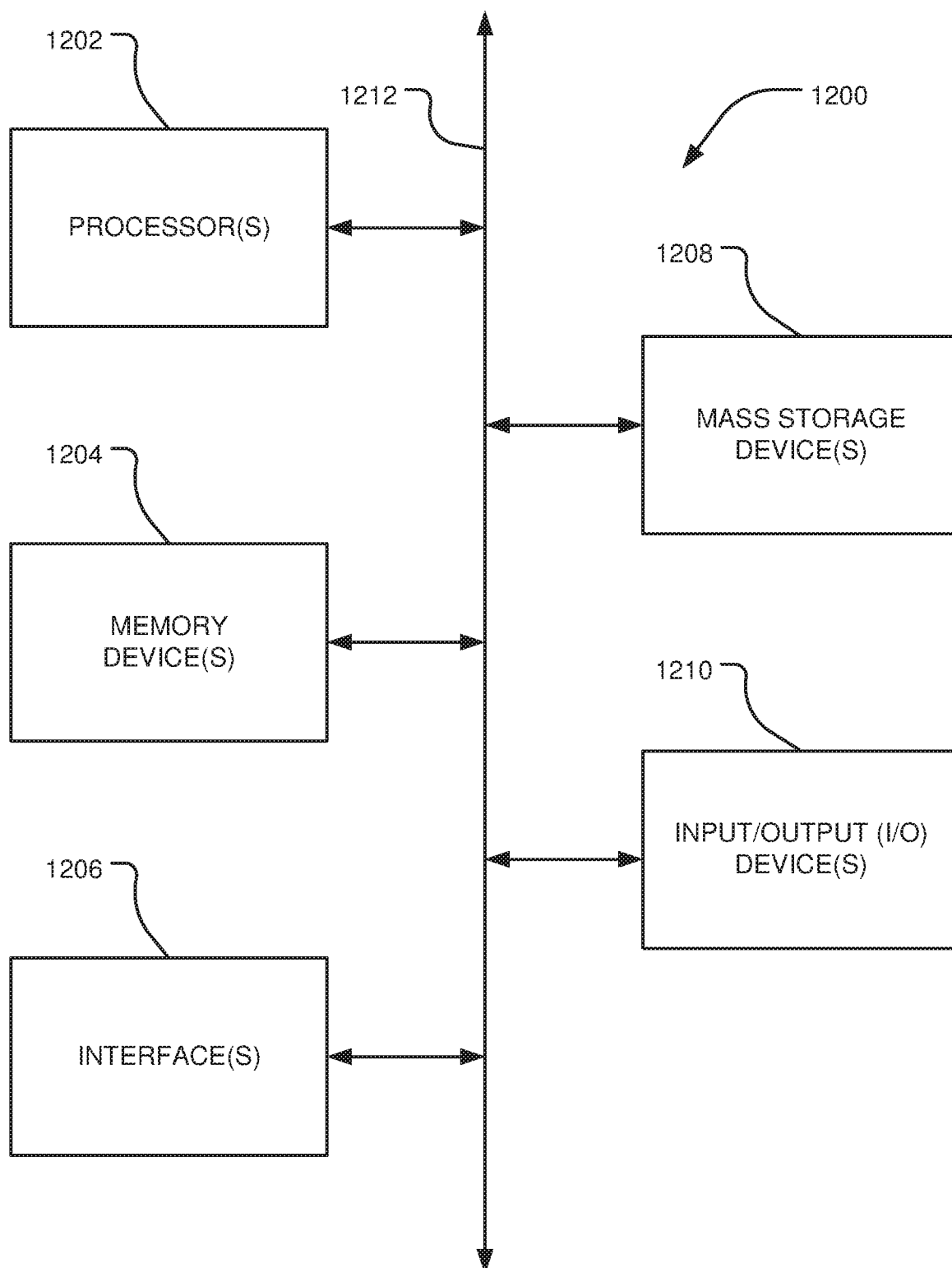
FIG. 12 is a block diagram depicting an example computing device consistent with at least one embodiment of processes and systems disclosed herein.

FIG. 12 is a block diagram depicting an example computing device 1200. In some embodiments, computing device 1200 is used to implement one or more of the systems and components discussed herein. For example, computing device 1200 may include or be part of a configuration and metadata manager 522, a database service manager 402, a processing platform 400, and/or any other components or systems discussed herein. As another example, the components, systems, or platforms discussed herein may include one or more computing devices 1200. Further, computing device 1200 may interact with any of the systems and components described herein. Accordingly, computing device 1200 may be used to perform various procedures and tasks, such as those discussed herein. Computing device 1200 can function as a server, a client or any other computing entity. Computing device 1200 can be any of a wide variety of computing devices, such as a desktop computer, a notebook computer, a server computer, a handheld computer, a tablet, and the like.

Computing device 1200 includes one or more processor(s) 1202, one or more memory device(s) 1204, one or more interface(s) 1206, one or more mass storage device(s) 1208, and one or more Input/Output (I/O) device(s) 1210, all of which are coupled to a bus 1212. Processor(s) 1202 include one or more processors or controllers that execute instructions stored in memory device(s) 1204 and/or mass storage device(s) 1208. Processor(s) 1202 may also include various types of computer-readable media, such as cache memory.

Memory device(s) 1204 include various computer-readable media, such as volatile memory (e.g., random access memory (RAM)) and/or nonvolatile memory (e.g., read-only memory (ROM)). Memory device(s) 1204 may also include rewritable ROM, such as Flash memory.

Mass storage device(s) 1208 include various computer readable media, such as magnetic tapes, magnetic disks, optical disks, solid state memory (e.g., Flash memory), and so forth. Various drives may also be included in mass storage device(s) 1208 to enable reading from and/or writing to the various computer readable media. Mass storage device(s) 1208 include removable media and/or non-removable media.

I/O device(s) 1210 include various devices that allow data and/or other information to be input to or retrieved from computing device 1200. Example I/O device(s) 1210 include cursor control devices, keyboards, keypads, microphones, monitors or other display devices, speakers, printers, network interface cards, modems, lenses, CCDs or other image capture devices, and the like.

Interface(s) 1206 include various interfaces that allow computing device 1200 to interact with other systems, devices, or computing environments. Example interface(s) 1206 include any number of different network interfaces, such as interfaces to local area networks (LANs), wide area networks (WANs), wireless networks, and the Internet.

Bus 1212 allows processor(s) 1202, memory device(s) 1204, interface(s) 1206, mass storage device(s) 1208, and I/O device(s) 1210 to communicate with one another, as well as other devices or components coupled to bus 1212. Bus 1212 represents one or more of several types of bus structures, such as a system bus, PCI bus, IEEE 1394 bus, USB bus, and so forth.

EXAMPLES

The following examples pertain to further embodiments.

Example 1 is a method that includes storing table data for a database, the table data including information in rows and columns of one or more database tables. The method includes storing metadata on immutable storage, the metadata including information about the table data for the database.

In Example 2, storing the metadata as in Example 1 includes storing and managing metadata in files on the immutable storage.

In Example 3, the metadata as in any of Examples 1-2 includes an indication of added or deleted table data files.

In Example 4, the metadata as in any of Examples 1-3 includes file information for files including the table data, the file information including one or more of a file name and a storage location.

In Example 5, the immutable storage as in any of Examples 1-4 includes a cloud storage resource.

In Example 6, the method as in any of Examples 1-5 includes storing information about the metadata in mutable storage.

In Example 7, the information about the metadata as of Example 6 is stored in a key-value store.

In Example 8, the information about the metadata as in any of Examples 6-7 includes information indicating a version and indicating one or more metadata files including metadata corresponding to the version.

In Example 9, the method as in any of Examples 1-8 further includes, in response to a change in the table data, creating a new metadata file in the immutable storage without modifying previous metadata files, the new metadata file including metadata indicating the change in the table data.

In Example 10, the metadata in the new metadata file of Example 9 indicates an addition or a deletion of a table data file including the table data.

In Example 11, the method as in any of Examples 9-10 further includes deleting an expired metadata file.

In Example 12, the method as in any of Examples 1-11 further includes consolidating metadata from two or more old metadata files into a consolidated metadata file.

In Example 13, the consolidated metadata file of Example 12 includes metadata reflecting the table data changes indicated in the two or more old metadata files.

In Example 14, the consolidating in any of Examples 12-13 includes deleting the two or more old metadata files.

In Example 15, the method as in any of Examples 12-14 further includes deleting one or more table data files not referenced by metadata in the consolidated metadata file.

In Example 16, the method as in any of Examples 1-15 further includes receiving a query directed to a database including the table data and. retrieving a plurality of uncached metadata files corresponding to the query in parallel from the immutable storage.

In Example 17, the method of Example 16 further includes determining a scan set of table data files based on metadata files corresponding to the query, wherein determining the scan set includes reading a first metadata file before a second metadata file has been fully downloaded, the plurality of uncached metadata files including the first metadata file and the second metadata file.

In Example 18, the scan set of Example 17 indicates one or more table data files needed to perform the query.

In Example 19, storing the metadata as in any of Examples 1-18 includes storing the metadata in a column-by-column format.

In Example 20, the method of Example 19 further includes encrypting the metadata column-by-column to allow for independent decryption and reading of metadata for a specific column.

In Example 21, the method of any of Examples 19-20 further includes storing a hash of a column of metadata and comparing the stored hash with a computed hash (recently computed hash) to determine whether the metadata has been altered.

Example 22 is an apparatus including means to perform a method as in any of Examples 1-21.

Example 23 is a machine-readable storage including machine-readable instructions that, when executed, implement a method or realize an apparatus of any of Examples 1-22.

The flow diagrams and block diagrams herein illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein provide a flexible and scalable data warehouse using new data processing platforms, methods, systems, and algorithms. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database using any data storage architecture and using any language to store and retrieve data within the database. The systems and methods described herein may also provide a multi-tenant system that supports isolation of computing resources and data between different customers/clients and between different users within the same customer/client.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A method comprising:

storing table metadata for a current version of a database table in a current version set of one or more table-metadata files;

detecting a modification to the current version of the database table, the modification resulting in a new version of the database table, the new version of the database table being stored in a new version set of one or more table-data files; the new version set of one or more table-data files being different than a current version set of one or more table-data files, the table metadata is stored in metadata storage, the new version of the database table is stored in second storage different than the metadata storage; and in response to detecting the modification to the current version of the database table, generating and storing a new version set of one or more table-metadata files, the new version set of one or more table-metadata files comprising table metadata for the new version of the database table, the new version set of one or more table-metadata files is stored in the metadata storage, the second storage comprises immutable storage, the immutable storage comprises data storage in which data is not updated in place.

2. The method of claim 1, further comprising:

storing the current version of the database table in the current version set of one or more table-data files, wherein the current version set of one or more table-data files and the new version set of one or more table-data files are also stored in the immutable storage.

3. The method of claim 1, wherein the metadata storage comprises immutable storage, the immutable storage comprises data storage in which data is not updated in place.

4. The method of claim 1, wherein the metadata store comprises a key-value store, a main memory storage, or a file system storage.

5. The method of claim 1, further comprising:

consolidating the new version set of one or more table-metadata files by generating a second new version set of table-metadata files, the second new version set of table-metadata files comprising metadata absent of information from files that have been deleted, the second new version set of table-metadata files being smaller than the new version set of table-metadata files.

6. The method of claim 1, further comprising:

caching, when processing a first query, at least one of the table-metadata files in at least one of the current version set of one or more table-metadata files and the new version set of one or more table-metadata files;

receiving a subsequent query directed to the database table;

downloading, from the metadata storage, uncached table-metadata files in a scan set of table-metadata files for the subsequent query; and processing the subsequent query using the table-metadata files that have been downloaded.

7. The method of claim 6, wherein the scan set comprises an aggregation of delete or added files.

8. The method of claim 6, wherein the uncached table-metadata files are downloaded in parallel, and a first downloaded table-metadata file is read before a second table-metadata file has been completely downloaded.

9. A system comprising:
a processor; and
a memory device including instructions, which when executed by the processor, cause the processor to perform operations comprising:
storing table metadata for a current version of a database table in a current version current version set of one or more table-metadata files;
detecting a modification to the current version of the database table, the modification resulting in a new version of the database table, the new version of the database table being stored in a new version set of one or more table-data files, the new version set of one or more table-data files being different than a current version set of one or more table-data files, the table metadata is stored in metadata storage, the new version of the database table is stored in second storage different than the metadata storage; and
in response to detecting the modification to the current version of the database table, generating and storing a new version set of one or more table-metadata files, the new version set of one or more table-metadata files comprising table metadata for the new version of the database table, the new version set of one or more table-metadata files is stored in the metadata storage, the second storage comprises immutable storage, the immutable storage comprises data storage in which data is not updated in place.

10. The system of claim 9, wherein the memory device includes further instructions, which when executed by the processor, cause the processor to perform further operations comprising:
storing the current version of the database table in the current version set of one or more table-data files, wherein the current version set of one or more table-data files and the new version set of one or more table-data files are also stored in the immutable storage.

11. The system of claim 9, wherein the metadata storage comprises immutable storage, the immutable storage comprises data storage in which data is not updated in place.

12. The system of claim 9, wherein the metadata store comprises a key-value store, a main memory storage, or a file system storage.

13. The system of claim 9, wherein the memory device includes further instructions, which when executed by the processor, cause the processor to perform further operations comprising:
consolidating the new version set of one or more table-metadata files by generating a second new version set of table-metadata files, the second new version set of table-metadata files comprising metadata absent of information from files that have been deleted, the second new version set of table-metadata files being smaller than the new version set of table-metadata files.

14. The system of claim 9, wherein the memory device includes further instructions, which when executed by the processor, cause the processor to perform further operations comprising:
caching, when processing a first query, at least one of the table-metadata files in at least one of the current version set of one or more table-metadata files and the new version set of one or more table-metadata files;
receiving a subsequent query directed to the database table;
downloading, from the metadata storage, uncached table-metadata files in a scan set of table-metadata files for the subsequent query; and
processing the subsequent query using the table-metadata files that have been downloaded.

15. The system of claim 14, wherein the scan set comprises an aggregation of deleted or added files.

16. The system of claim 14, wherein the uncached table-metadata files are downloaded in parallel, and a first downloaded table-metadata file is read before a second table-metadata file has been completely downloaded.

17. A non-transitory computer-readable medium comprising instructions, which when executed by a processor, cause the processor to perform operations comprising:
storing table metadata for a current version of a database table in a current version set of one or more table-metadata files;
detecting a modification to the current version of the database table, the modification resulting in a new version of the database table, the new version of the database table being stored in a new version set of one or more table-data files, the new version set of one or more table-data files being different than a current version set of one or more table-data files, the table metadata is stored in metadata storage, the new version of the database table is stored in second storage different than the metadata storage; and
in response to detecting the modification to the current version of the database table, generating and storing a new version set of one or more table-metadata files, the new version set of one or more table-metadata files comprising table metadata for the new version of the database table, the new version set of one or more table-metadata files is stored in the metadata storage the second storage comprises immutable storage, the immutable storage comprises data storage in which data is not updated in place.

18. The non-transitory computer-readable medium of claim 17, wherein the non-transitory computer-readable medium comprises further instructions, which when executed by the processor, further cause the processor to perform further operations comprising:
storing the current version of the database table in the current version set of one or more table-data files, wherein the current version set of one or more table-data files and the new version set of one or more table-data files are also stored in the immutable storage.

19. The non-transitory computer-readable medium of claim 17, wherein the metadata storage comprises immutable storage, the immutable storage comprises data storage in which data is not updated in place.

20. The non-transitory computer-readable medium of claim 17, wherein the metadata store comprises a key-value store, a main memory storage, or a file system storage.

21. The non-transitory computer-readable medium of claim 17, wherein the non-transitory computer-readable medium comprises further instructions, which when executed by the processor, further cause the processor to perform further operations comprising:
consolidating the new version set of one or more table-metadata files by generating a second new version set of table-metadata files, the second new version set of table-metadata files comprising metadata absent of information from files that have been deleted, the second new version set of table-metadata files being smaller than the new version set of table-metadata files.

22. The non-transitory computer-readable medium of claim 17, wherein the non-transitory computer-readable medium comprises further instructions, which when executed by the processor, further cause the processor to perform further operations comprising:

caching, when processing a first query, at least one of the table-metadata files in at least one of the current version set of one or more table-metadata files and the new version set of one or more table-metadata files;

receiving a subsequent query directed to the database table;

downloading, from the metadata storage, uncached table-metadata files in a scan set of table-metadata files for the subsequent query; and processing the subsequent query using the table-metadata files that have been downloaded.

23. The non-transitory computer-readable medium of claim 22, wherein the scan set comprises an aggregation of deleted or added files.

24. The non-transitory computer-readable medium of claim 22, wherein the uncached table-metadata files are downloaded in parallel, and a first downloaded table-metadata file is read before a second table-metadata file has been completely downloaded.

\* \* \* \* \*

UNITED STATES PATENT AND TRADEMARK OFFICE
CERTIFICATE OF CORRECTION

PATENT NO. : 10,977,241 B2  
APPLICATION NO. : 16/915435  
DATED : April 13, 2021  
INVENTOR(S) : Dageville et al.

Page 1 of 1

It is certified that error appears in the above-identified patent and that said Letters Patent is hereby corrected as shown below:

In the Claims

In Column 18, Line 10, in Claim 1, delete "files;" and insert --files,-- therefor In Column 18, Line 63, in Claim 7, delete "delete" and insert --deleted-- therefor In Column 19, Line 7, in Claim 9, delete "current version current version" and insert --current version-- therefor In Column 20, Line 32, in Claim 17, after "storage", insert --,--

Signed and Sealed this  
Third Day of August, 2021

Drew Hirshfeld  
*Performing the Functions and Duties of the*  
*Under Secretary of Commerce for Intellectual Property and*  
*Director of the United States Patent and Trademark Office*